(12) United States Patent
Watanabe (10) Patent No.: US 8,375,148 B2
(45) Date of Patent: Feb. 12, 2013

(54) COMPUTER SYSTEM, DEVICE SHARING METHOD, AND DEVICE SHARING PROGRAM

(75) Inventor: Isao Watanabe, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/420,854

(22) Filed: Mar. 15, 2012

(65) Prior Publication Data

US 2012/0174103 A1 Jul. 5, 2012

Related U.S. Application Data

(63) Continuation of application No. 12/457,252, filed on Jun. 4, 2009, now Pat. No. 8,156,253.

(30) Foreign Application Priority Data

Jun. 11, 2008 (JP) ................................ 2008-152507

(51) Int. Cl.
G06F 3/00 (2006.01)
(52) U.S. Cl. .......................................... 710/8; 718/104
(58) Field of Classification Search .................. None
See application file for complete search history.

(56) References Cited

U.S. PATENT DOCUMENTS

| 5,581,709 | A | 12/1996 | Ito et al. |
|---|---|---|---|
| 7,313,637 | B2 | 12/2007 | Tanaka et al. |
| 7,447,854 | B1 * | 11/2008 | Cannon ........................ 711/162 |
| 7,506,084 | B2 | 3/2009 | Moerti et al. |
| 7,546,398 | B2 | 6/2009 | Cornell et al. |
| 2004/0187106 | A1 | 9/2004 | Tanaka et al. |
| 2008/0307180 | A1 | 12/2008 | Hattori et al. |
| 2009/0234974 | A1 | 9/2009 | Arndt et al. |
| 2009/0276773 | A1 * | 11/2009 | Brown et al. .................... 718/1 |
| 2009/0300660 | A1 | 12/2009 | Solomon et al. |

FOREIGN PATENT DOCUMENTS

JP 2008-102930 1/2005

OTHER PUBLICATIONS

"Single Root I/O Virtualization and Sharing Specification Revision 1.0", (Sep. 11, 2007), Chapter 1, Architectural Overview, pp. 11-24.
"Multi-Root I/O Virtualization and Sharing Specification Revision 1.0", (May 12, 2008), Chapter 1, Architectural Overview, pp. 15-34.
Jun Suzuki, et al., "Simultaneous Multi-host Sharing of Single-root I/O Virtualization with ExpEther Interconnect", System Platforms Research Laboratories of NEC Corporation, Mar. 13, 2008 (2 pages) along with an English translation (6 pages).
Notification of Reasons for Refusal issued by the Japanese Patent Office on Oct. 11, 2011 in Japanese Patent Application No. 2008-152507 (3 pages) along with an English translation (4 pages).

* cited by examiner

*Primary Examiner* — Elias Mamo
(74) *Attorney, Agent, or Firm* — Stites & Harbison, PLLC; Juan Carlos A. Marquez, Esq.; Nicholas B. Trenkle, Esq.

(57) ABSTRACT

In a storage system provided with a plurality of storage modules, the rated power consumption can be reduced. The storage system is provided with a charge control unit. The charge control unit stops, when detecting that a predetermined number of a plurality of battery modules are during battery charging, the battery charging in the remaining battery modules.

8 Claims, 5 Drawing Sheets

COMPUTER SYSTEM, DEVICE SHARING METHOD, AND DEVICE SHARING PROGRAM

CLAIM OF PRIORITY

This application is a Continuation application of U.S. application Ser. No. 12/457,252 filed oh Jun. 4, 2009. Priority is claimed based on U.S. application Ser. No. 12/457,252 filed on Jun. 4, 2009, which claims priority from Japanese application JP 2008-152507 filed on Jun. 11, 2008, the content; of which is hereby incorporated by reference into this application.

BACKGROUND OF THE INVENTION

1. Field of the Invention

The present invention relates, to a computer system, a device sharing method, and a device sharing program. The invention, relates more particularly to PCI device sharing in which a plurality of virtual computers formed on a plurality of physical computers share a PCI SR-IOV (Single Root I/O Virtualization) device, which requires an interface between a PF (Physical Function) and a VF (Virtual Function).

2. Description of the Related Art

A virtual computer system in which a plurality of virtual computers (LPARs) are built oh a physical computer to share an I/O device is put into practical use for the purpose of using a computer system more intensively, with increased power savings, at a lower cost, and with enhanced efficiency.

As an associated conventional technique, an I/O device virtual sharing method disclosed, for instance, in JP-A-2004-252591 enables a plurality of virtual computers built on a single physical computer to share a PCI I/O device.

Further, a PCI-SIG standard is disclosed in Single Root I/O Virtualization and Sharing Specification Revision 1.0 (Sep. 11, 2007) Chapter 1 Architectural Overview (page 11 to page 24). According to this standard, device sharing can be achieved when a plurality of VFs formed in ah SR-IOV-compliant device are allocated to a plurality of virtual computers on an SR-IOV-compliant VMM (Virtual Machine Monitor).

Furthermore, a standard that is being developed by the PCI-SIG is disclosed in Multi-Root I/O visualization and Sharing Specification Revision 1.0 (May 12, 2008) Chapter 1 Architectural Overview (page 15 to page 34). According to this standard, device sharing can be achieved when a PF and a VF that are formed in an MR-IOV (Multi-Root IOV) compliant device are allocated to a plurality of physical computers on an MR-IOV-compliant computer system.

SUMMARY OF THE INVENTION

Ordinary PCI devices and SR-IOV devices described above are relatively inexpensive. However, they cannot be shared by a plurality of physical computers for intensification purposes.

Meanwhile, MR-IOV devices can be shared by a plurality of physical computers for intensification purposes. However, they are relatively expensive.

An object of the present invention is to enable a plurality of physical computers to share an SR-IOV device, which requires an interface between a PF and a VF.

In an environment where a PCI SR-IOV device is allocated to virtual machine monitors on a plurality of physical computers through an I/O switch, the present invention allocates a PF to a first virtual machine monitor and a plurality of VFs to an LPAR on an optional virtual machine monitor. When a second virtual machine monitor detects an event that is generated from a VF to the PF, the second virtual machine monitor communicates the detected event to the first virtual machine monitor to which the PF is allocated, and allows the first virtual machine monitor to execute the PF event. Further, when the first virtual machine monitor detects ah event that is generated from the PF to a VF, the first virtual machine monitor communicates the detected event to the second virtual machine monitor to which the target VF is allocated, and allows an LPAR on the second virtual machine monitor to execute the VF event.

According to an aspect of the present invention, there is provided a computer system capable of connecting a plurality of physical computers to an I/O device through an I/O switch and sharing the I/O device; wherein the plurality of physical computers each include a plurality of LPARs built on the physical computers, and a plurality of virtual machine monitors for managing the plurality of LPARs; wherein the I/O device includes a PF (Physical Function), which can be allocated to one of the plurality of physical computers, and a plurality of VFs (Virtual Functions), which can be allocated to the plurality of LPARs; wherein the plurality of virtual machine monitors include a first virtual machine monitor to which the PF in the I/O device is allocated, and a second virtual machine monitor to which the PF is not allocated; wherein the first and second virtual machine monitors include VF execution means for executing a VF event for the plurality of VFs in the I/O device, which is allocated to the plurality of LPARs; and wherein the first virtual machine monitor includes PF execution means for executing a PF event for the PF in the I/O device, which is detected by the first or second virtual machine monitor.

According to another aspect of the present invention, there is provided a device sharing method for use in a computer system that is configured by connecting a plurality of physical computers, which each include one or more LPARs built on each physical computer and a plurality of virtual machine monitors for managing the plurality of LPARs, to a PCT-SIG-compliant SR-IOV (Single Root I/O Visualization) device, which includes a PF (Physical Function) that can be allocated to one of the physical computers and a plurality of VFs (Virtual Functions) that can be allocated to the plurality of LPARs, through ah I/O switch, the device sharing method comprising the steps of: configuring the plurality of virtual machine monitors including a first virtual machine monitor to which the PF in the SR-IOV device is allocated and a second virtual machine monitor to which the PF cannot be allocated; executing, in the first and second virtual machine monitors, a VF event for the plurality of VFs in the SR-IOV device, which is allocated to the plurality of LPARs; and executing, in the first virtual machine monitor, a PF event for the PF in the SR-IOV device, which is detected, by the first or second virtual machine monitor.

According to still another aspect of the present invention, there is provided a device sharing program to be executed in a computer system that is configured by connecting a plurality of physical computers, which each include one or more LPARs built on each physical computer and a virtual machine monitor for managing the plurality of LPARs, to a PCI-SIG-compliant SR-IOV (Single Root I/O Visualization) device, which includes a PF (Physical Function) that can be allocated to one of the physical computers and a plurality of VPs (Virtual Functions) that can be allocated to the plurality of LPARs, through an I/O switch, the device sharing program comprising: means for executing, in the first virtual machine monitor to which the PF in the SR-IOV device is allocated and in the second virtual machine monitor to which the PF is hot allocated, a VF event for the plurality of VFs in the SR-IOV device, which is allocated to the plurality of LPARs; and means for executing, in the first virtual machine monitor, a PF event for the PF in the SR-IOV device, which is detected by the first or second virtual machine monitor.

The present invention enables a plurality of physical computers to share an SR-IOV device, and makes it possible to establish a computer system that is less expensive and more intensive than a computer system to which MR-IOV would be applied.

DETAILED DESCRIPTION OF THE PREFERRED EMBODIMENTS

According to one aspect of the present invention, the computer system is configured by mounting a plurality of blade servers on a chassis as physical computers, mounting a plurality of SR-IOV devices in an I/O box, and connecting a plurality of chassis and a plurality of I/O boxes with an I/O switch. A virtual machine monitor is executed on the plurality of blade servers. A plurality of LPARs are executed on the virtual machine monitor. The LPARs use a VF in an SR-IOV device. It is necessary to exercise PF control with a virtual machine monitor oh an optional blade server. It is assumed that a PF-controlling virtual machine monitor on a blade server is a master virtual machine monitor (a first virtual machine monitor). Further, a virtual machine monitor executing an LPAR that uses any other VF is assumed to be a slave virtual machine monitor (a second virtual machine monitor). When individual PFs in the plurality of SR-IOV devices are to be controlled by different virtual machine monitors, different master virtual machine monitors can be set up for the SR-IOV devices oh an individual basis.

Embodiments of the present invention will now be described with reference to the accompanying drawings.

First Embodiment

Figure 1:
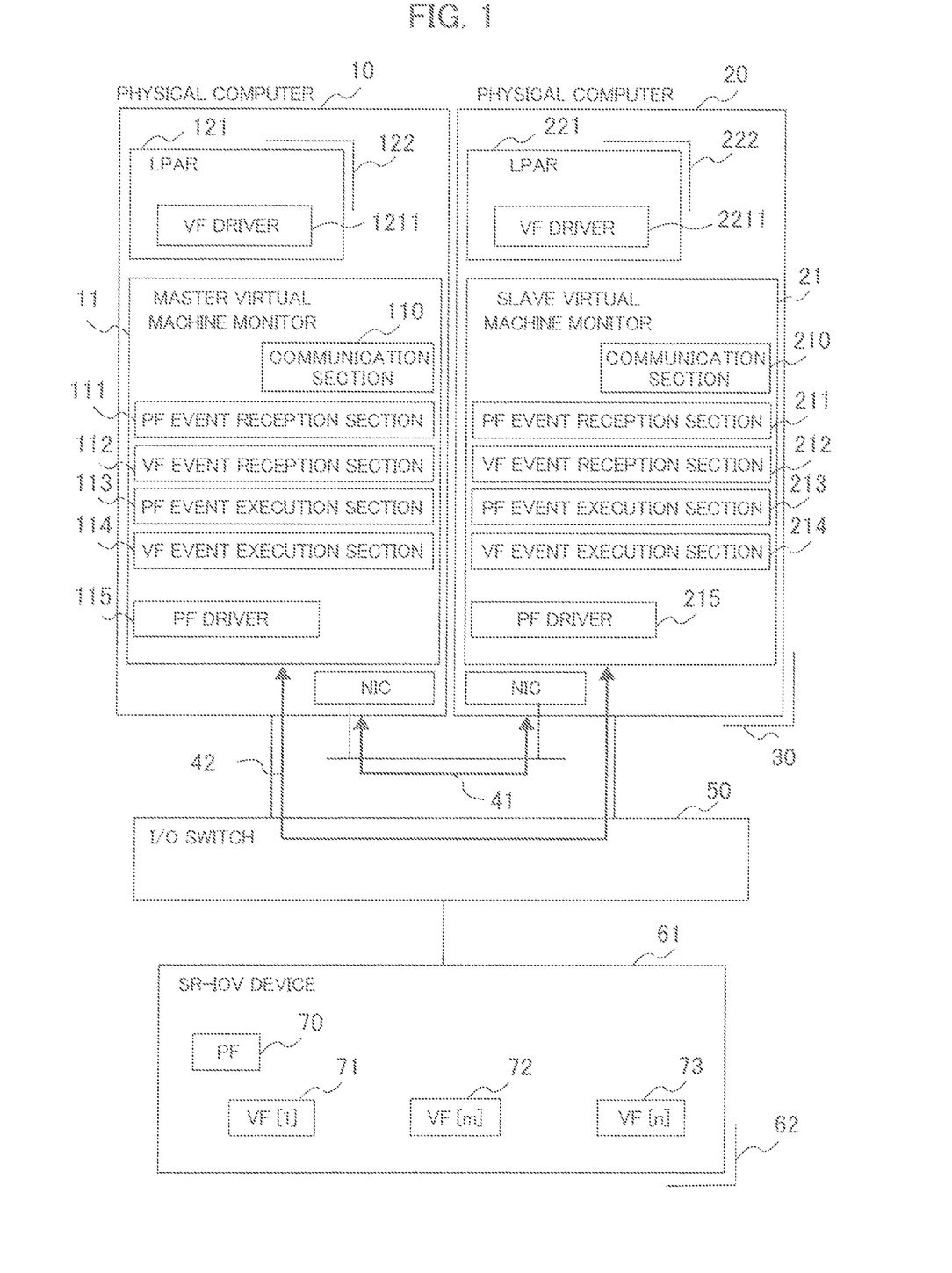
FIG. 1 is a diagram illustrating a typical configuration of a computer system according to an embodiment of the present invention.

FIG. 1 is a diagram illustrating a typical configuration of a computer system according to an embodiment of the present invention.

The computer system is configured so that a plurality of physical computers 10, 20, 30 are connected to a plurality of SR-IOV devices 61, 62 through an I/O switch 50 to share the SR-IOV devices.

The SR-IOV devices 61, 62 each include a PF (Physical Function) 70 and a plurality of VFs (Virtual Functions) VF[1] 71, VF[m] 72, VF[n] 73. The PF is IOV functions and IOV management functions (e.g., initial setup function and reset function), which are allocated to a physical computer. The VFs are IOV functions allocated to an LPAR, such as various functions of a network connection card and a storage connection card.

The physical computer 10 includes a plurality of virtual computers (LPARs) 121, 122 and a master virtual machine monitor (VMM) 11, which controls the LPARs and the PF 70. Similarly, the physical computers 20, 30 each include a plurality of virtual computers (LPARs) 221, 222 and a slave virtual machine monitor (VMM) 21, which controls the LPARs but does not control the PF 70. The functions of the LPARs and of the master and slave virtual machine monitors are implemented when the associated programs are executed on a physical computer.

Each virtual machine monitor is classified as either a master or a slave because the single PF in an SR-IOV device is allocated to only one virtual machine monitor. The virtual machine monitor to which the PF is allocated is called the master virtual machine monitor 11, whereas the other virtual machine monitor is called the slave virtual machine monitor.

The I/O switch 50 connects the plurality of physical computers 10, 20, 30 to the plurality of SR-IOV devices 61, 62. The communication between the master virtual machine monitor 11 and the slave virtual machine monitor 21 is established through a LAN (Local Area Network) 41 and communication sections 110, 210. The communication between the master and slave virtual machine monitors 11, 12 and the SR-IOV device is established through a dedicated, communication line 42, which is routed through the I/O switch 50.

The PF 70 in the SR-IOV device 61 is allocated to the master virtual machine monitor 11 through the I/O switch 50. The VFs 71-73 in the SR-IOV device 61 are allocated to the plurality of LPARs 121, 122, 221, 222, which are managed by the master and slave virtual machine monitors 11, 21, through the I/O switch 50 under the control of the master virtual machine monitor 11 or slave virtual machine monitor 21.

The plurality of LPARs 121, 122 on the physical computer 10 each include a VF driver 1211. The VF driver 1211 controls the plurality of VFs 71-73 to which the LPARs 121, 122 are allocated. Similarly, the plurality of LPARs 221, 222 on the physical computers 20, 30 each include a VF driver 2211. The VF driver 2211 controls the plurality of VFs 71-73 to which the LPARs 221, 222 are allocated.

The master virtual machine monitor 11 includes a communication section 110 for communicating with the slave virtual machine monitor 21, a PF event reception section 111 for receiving a PF event transmitted from the slave virtual machine monitor 21, a VF event reception section 112 for receiving a VF event transmitted from the slave virtual machine monitor 21, a PF event execution section 113 for executing a PF event, a VF event execution section for executing a VF event, and a PF driver 115 for controlling the PF 70. Similarly, the slave virtual machine monitor 21 includes a communication section 210, a PF event reception section 211, a VF event reception section 212, a PF event execution section 213, a VF event execution section 214, and a PF driver 215. The PF event is an event that is to be executed by the PF 70. For example, the PF event is a network error process or a process for an unrecoverable error in a storage. The VF event is an event that is to be executed by the VFs 71-73. For example, the VF event is a process that is performed to terminate an LPAR process safely in the event of a power supply failure.

As is obvious from the above explanation, the PF 70 in the SR-IOV device 61 is controlled only by the PF driver 115 of the master virtual machine monitor 11. The PF driver 215, PF event reception section 211, and PF event execution section 213 of the slave virtual machine monitor 21 do not control the PF 70. However, the plurality of virtual machine monitors may interchange their roles (switch from a master to a slave). More specifically, a slave virtual machine monitor may switch to a master virtual machine monitor. In such an instance, the slave virtual machine monitor 21, which has changed its role and acts as a master virtual machine monitor, operates so that the PF driver 215 controls the PF 70 in the SR-IOV device 61. In addition, the PF driver 215 and PF event reception section 211 of the slave virtual machine monitor 21 are used effectively.

PF event processes, which a virtual machine monitor performs when a PF event for the PF 70 is generated from the VF drivers 1211, 2211, will now be described with reference to FIGS. 2 and 3.

These processes are performed when the programs for the master and slave virtual machine monitors are executed.

The subsequent explanation assumes that the computer system includes two physical computers (physical computers 10, 20), and that only one LPAR (LPAR 121 or LPAR 221) is built on each physical computer 10, 20, and further that there is only one SR-IOV device 60.

Figure 2:
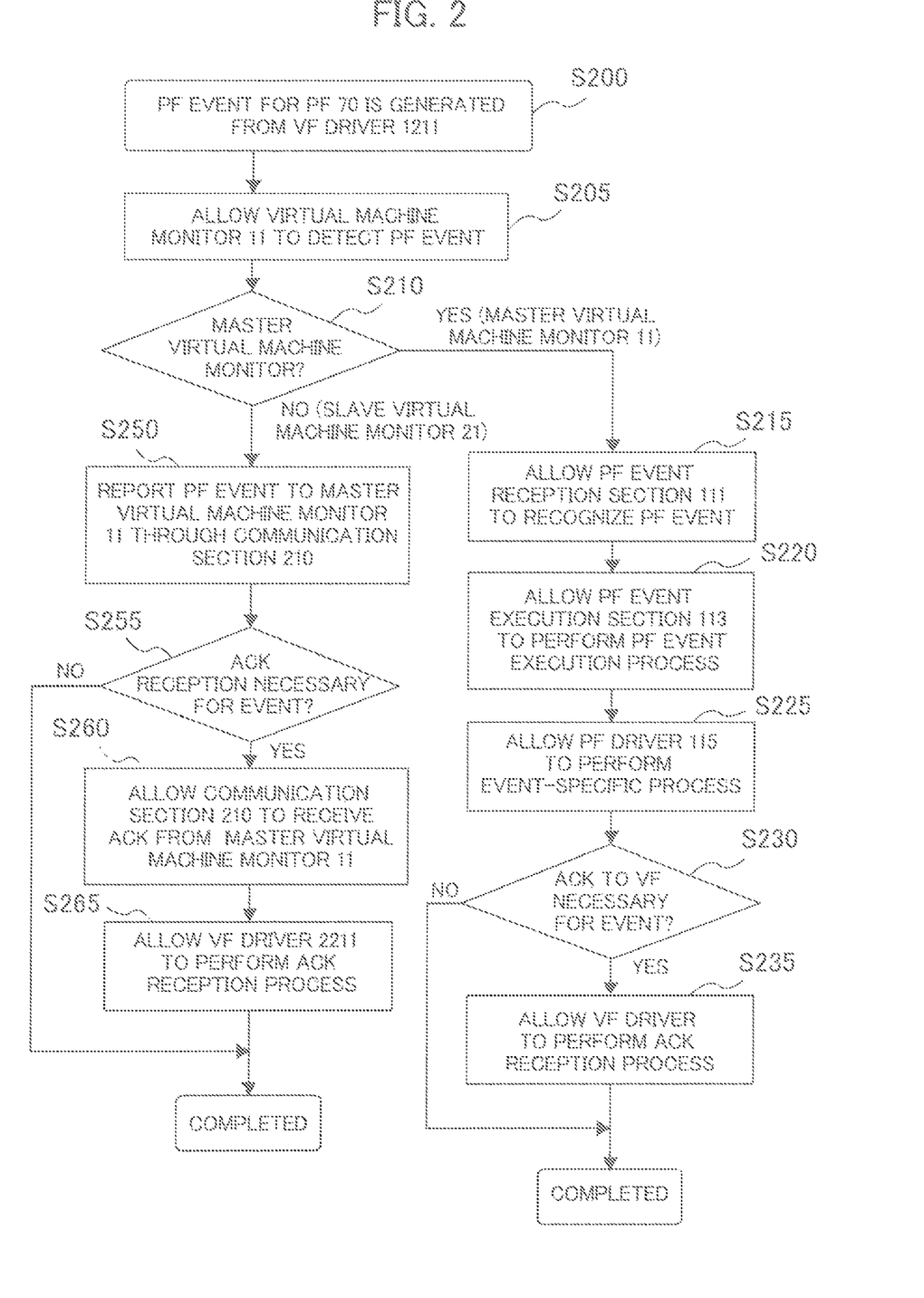
FIG. 2 is a flowchart illustrating a PF event process of a virtual machine monitor.

Processing steps S200 to S235 in an example shown in FIG. 2 are performed when a PF event for the PF 70 is generated from the LPAR 121 on the master virtual machine monitor 11 to which the VF [m] 72 is allocated, that is, when, for instance, the VF driver 1211 detects a failure and notifies the PF 70 of it.

First, the VF driver 1211 performs an interrupt process or uses register Write to generate a PF event for the PF 70 (step S200). The interrupt process is such that the VF driver 1211 detects a PF event, interrupts a current operation of the master virtual machine monitor 11, and causes the master virtual machine monitor 11 to handle the PF event. Register Write is an event monitoring register possessed by the SR-IOV device. The master virtual machine monitor detects event generation by checking for a flag written in the register.

The master virtual machine monitor 11 references the interrupt process or register Write to detect a PF event (step S205). In other words, PF event detection is accomplished by trapping an interrupt or register Write.

Next, step S210 is performed to check which virtual machine monitor has detected a PF event. If the PF event is detected by the master virtual machine monitor 11, the PF event reception section 111 recognizes the PF event (step S215). When the PF event is recognized, the PF event execution section 113 generates an interrupt or register Write transmits the PF event to the PF driver 115 (step S220).

The PF driver 115 recognizes the PF event and performs a process in accordance with the type of the event (step S225). If, for instance, a failure is detected by the VF driver 1211 to which the VF [m] 72 is allocated, the PF driver recovers from the failure, for instance, by resetting the VF[m] 72.

If it is found in step S230 that the PF event entails an ACK process for the VF [m] 72, that is, the event generation source entails a process for notifying the event generation source of normal completion of event reception, the master virtual machine monitor 11 performs an interrupt process or uses register Write to transmit an ACK to the VF driver 1211 on the LPAR 121, thereby causing the VF driver 1211 to perform an ACK reception process (step S235).

Meanwhile, processing steps S200 to S265 are performed when an event, for the PF 70 is generated from the LPAR 221 on the slave virtual machine monitor 21 to which the VF [n] 73 is allocated, that is, when, for instance, the VF driver 2211 detects a failure and notifies the PF 70 of it.

When, in step S200, the VF driver 2211 performs an interrupt process or uses register Write to generate a PF event for the PF 70, the slave virtual machine monitor 21 detects the PF event (step S205). When the slave virtual machine monitor 21 detects the PF event, (when the query in step S210 is answered "NO"), the master virtual machine monitor 11 to which the PF is allocated is notified of the PF eVeht through the communication section 210 (step S250) because the PF is not allocated to the slave virtual machine, monitor 21. It should be noted that the slave virtual machine monitor 21 communicates with the master virtual machine, monitor 11 through the communication section 210, LAN (Local Area Network) 41, and communication section 110.

Figure 3:
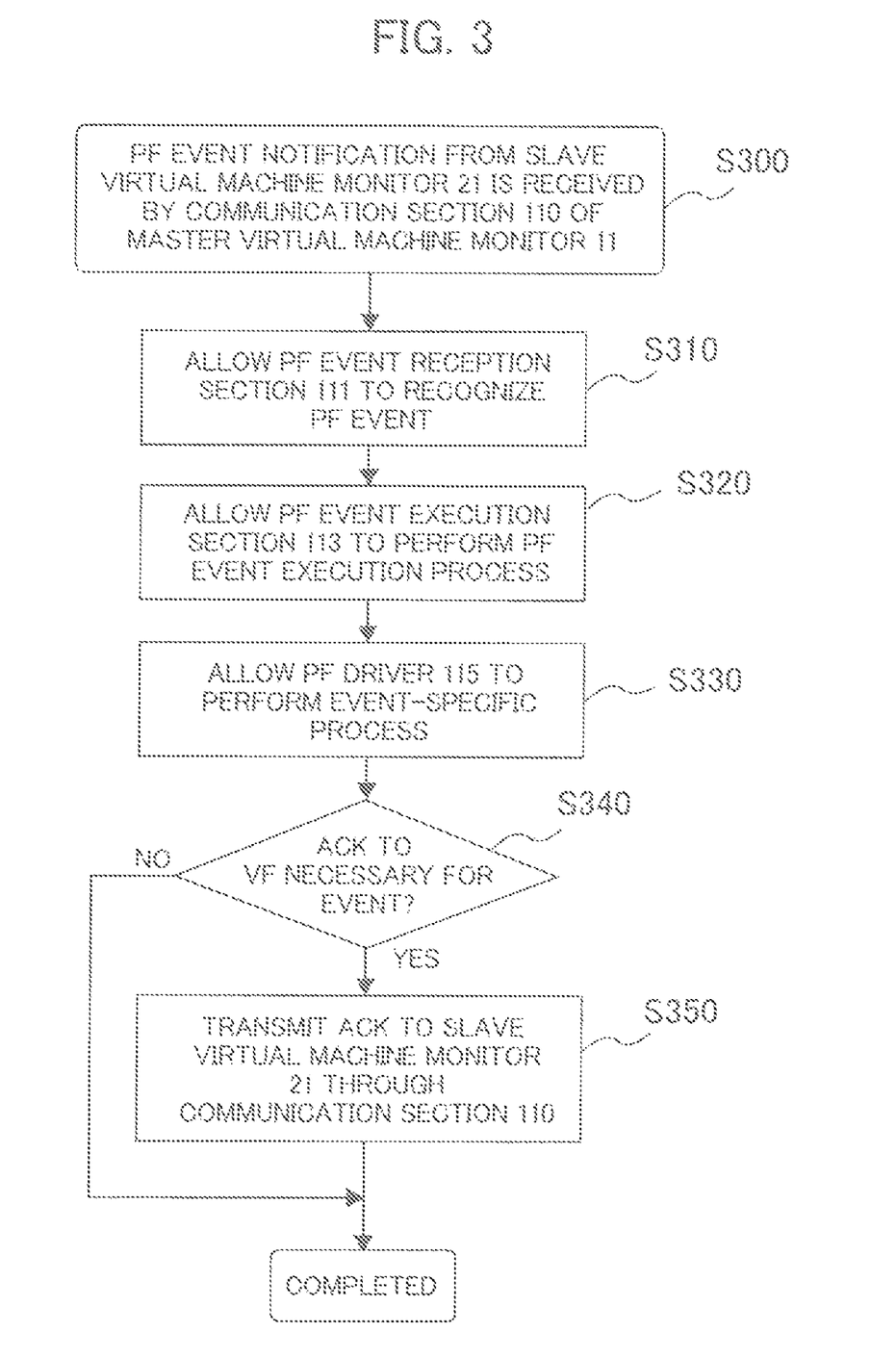
FIG. 3 is a flowchart illustrating a PF event process in a master virtual machine monitor.

As shown in FIG. 3, the master virtual machine monitor 11 performs a PF event process, so that the communication section 110 of the master virtual machine monitor 11 receives a PF event (step S300), thereby allowing the PF event reception section 111 to recognize the PF event (step S310). When the PF event is recognized, the PF event, execution section 113 generates an interrupt or uses register Write to transmit the PF event to the PF driver 115 (step S320).

The PF driver 115 recognizes the PF event and performs a process in accordance with the type of the PF event (step S330). For example, a network error process or a process for an unrecoverable error in a storage is performed in accordance with the type of the recognized PF event.

Next, step S340 is performed to judge whether the PF event entails an ACK to the VF 73. If the judgment result obtained, indicates that the PF event entails an ACK process for the VF[n] 73, that is, the event generation source (if, for instance, the VF 73, which is the event generation source, needs to know the result of event processing), step S350 is performed to transmit an ACK to the slave virtual machine monitor 21 through the communication section 110.

Referring again to FIG. 2, if the PF event entails an ACK process (if the query in step S255 is answered "YES"), the communication section 210 of the slave virtual machine monitor 21 waits to receive an ACK. Upon receipt of the ACK (step S260), the slave virtual machine monitor 21 performs ah interrupt process or uses register Write, to transmit the ACK to the VF driver 2211 on the LPAR 221 to which the VF [n] 73 is allocated, thereby allowing the VF driver 2211 to perform an ACK reception process (step S265).

Second Embodiment

A second embodiment of the present invention will now be described. The second embodiment relates to processes that the virtual machine system shown in FIG. 1 performs when a VF event for the VF[1] 71, VF [m] 72, or VF[n] 73 is generated from the PF driver 115 of the master virtual machine monitor 11 to which the PF 70 is allocated.

The processes will be described with reference to flowcharts in FIGS. 4 and 5. It is assumed that the second embodiment is equal to the first embodiment in the number of physical computers in the computer system, the number of LPARs on each physical computer, and the number of SR-IOV devices. It is also assumed that the processes are performed when the programs for the master and slave virtual machine monitors are executed.

Figure 4:
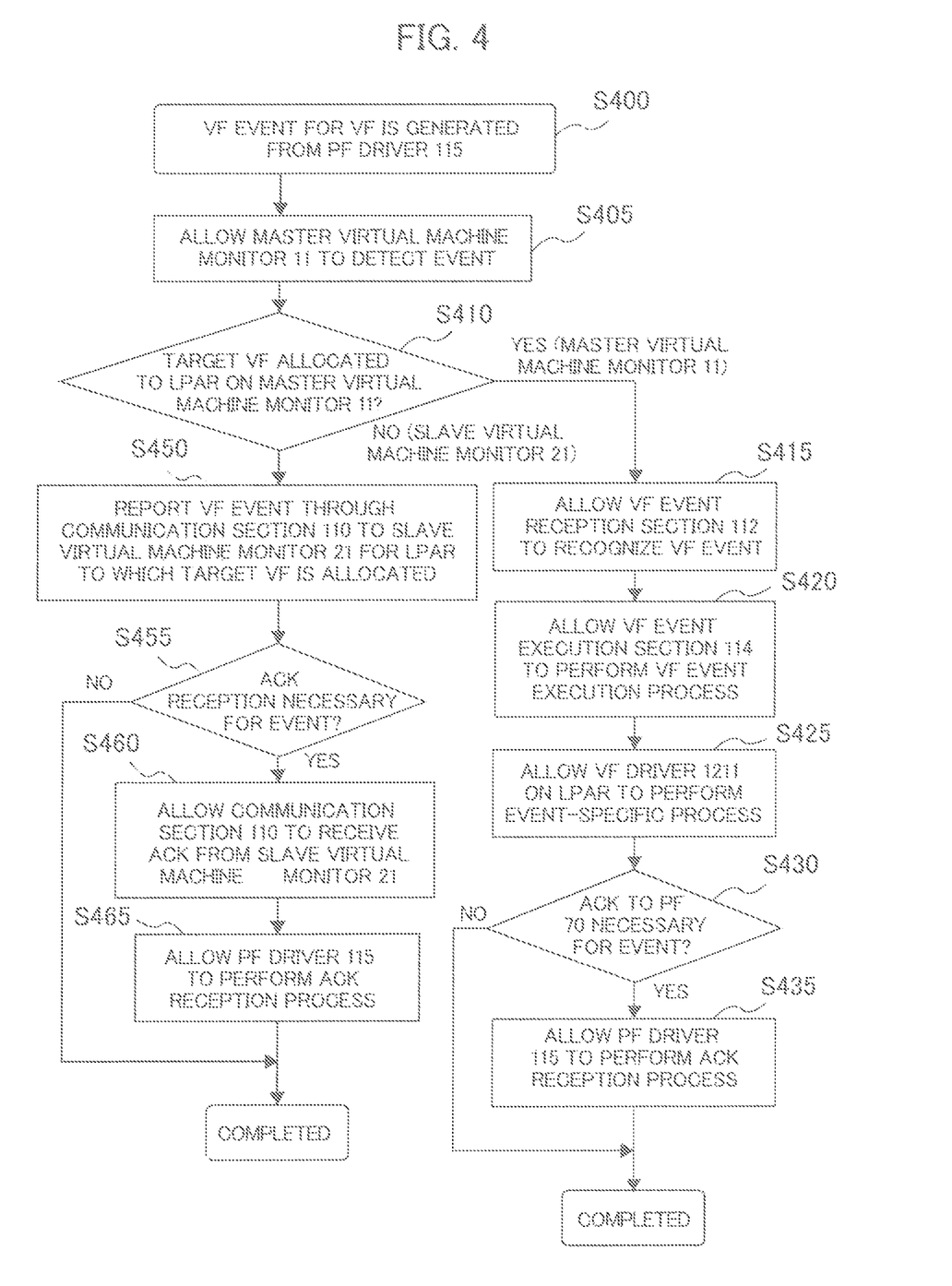
FIG. 4 is a flowchart illustrating a VF event process of a virtual machine monitor.
Figure 5:
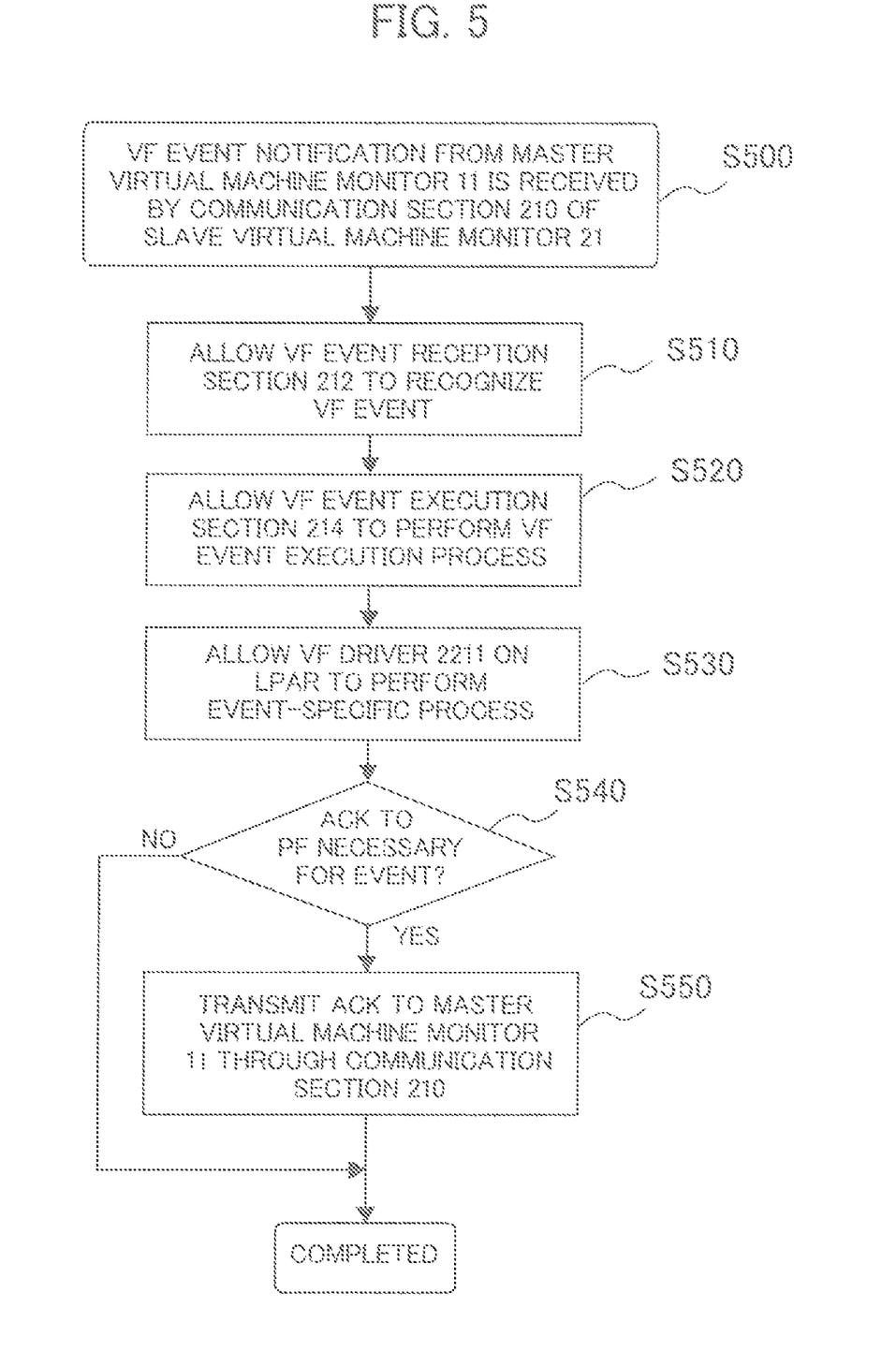
FIG. 5 is a flowchart illustrating a VF event process in a slave virtual machine monitor.

Processing steps S400 to S435 shown in FIG. 4 are performed when a VF event for the VF [m] 72, which is allocated to the LPAR 121, is generated from the PF 70, which is controlled on the master virtual machine monitor 11, that is, when, for instance, the PF driver 115 detects a failure and notifies all VFs (VF[1] 71, VF[m] 72, and VF[n] 73) of it.

First of all, the PF driver 115 performs an interrupt process or uses register Write to generate a VF event for the VF [m] 72 (step S400). The master virtual machine monitor 11 then detects a VF event (step S405). In other words, VF event detection is accomplished by trapping an interrupt or register Write.

Next, step S410 is performed to judge whether a target VF is allocated to the LPARs 121, 122 on the master virtual machine monitor 11. If the judgment result obtained indicates that the target VF [m] 72 is allocated to the LPAR 121 on the master virtual machine monitor 11, the VF event reception section 112 recognizes the VF event (step S415).

When the VF event is recognized, the VF event execution section 114 performs an interrupt process or uses register Write to transmit the VF event to the VF driver 1211 on the LPAR 121 to which the VF[m] 72 is allocated (step S420).

The VF driver 1211 recognizes the VF event and performs a process in accordance with the type of the event (step S425). For example, as a failure is detected in the PF 70, the VF driver for all VFs 71-73 attempts to terminate a device execution safely.

If it is found in step S430 that the VF event entails an ACK process for the PF 70, the master virtual machine monitor 11 performs an interrupt process or uses register Write to transmit an ACK to the PF driver 115, thereby causing the PF driver 115 to perform an ACK reception process (step S435).

Meanwhile, processing steps S400 to S465 are performed when a VF event for the VF[n] 73, which is allocated to the LPAR 221 on the slave virtual machine monitor 21, is generated from the PF 70 controlled on the master virtual machine monitor 11, that is, when, for instance, the PF driver 115 detects a failure and notifies the VF[1] 71, VF[m] 72, or VF[n] 73 of it.

When, in step S400, the PF driver 115 performs an interrupt process or uses register Write to generate a VF event for the VF[n] 73, the master virtual machine monitor 11 detects the VF event (step S405).

Next, step S410 is performed to judge whether a target VF is allocated to an LPAR on the master virtual machine monitor 11. If the judgment result obtained indicates that the target VF[n] 73 is allocated to the LPAR 221 on the slave virtual machine monitor 21, step S450 is performed so that the VF event is reported, through the communication section 110 to the slave virtual machine monitor 21, which controls the LPAR 221 to which the target VF[n] 73 is allocated.

A VF event process in the slave virtual machine monitor 21 will now be described with reference to FIG. 5. The communication section 110 of the slave virtual machine monitor 21 receives a VF event (step S500), thereby allowing the VF event reception section 112 to recognize the VF event (step S510).

When the VF event is recognized, the VF event execution section 114 generates an interrupt or uses, register Write to transmit, the VF event to the VF driver 2211 on the LPAR 221 to which the VF[n] 73 is allocated (step S520).

The VF driver 2211 recognizes the VF event and performs a process in accordance with the type of the VF event (step S530). Step S540 is then performed to judge whether the VF event entails an ACK to the PF 70. If the judgment result obtained, indicates that the VF event entails an ACK process for the PF 70, step S550 is performed to transmit an ACK to the master virtual machine monitor 11 through the communication section 210.

Referring again to FIG. 4, if the VF event entails an ACK process (if the query in step S455 is answered "YES"), the communication section 110 waits to receive an ACK. Upon receipt of the ACK (step S460), the master virtual machine monitor 11 performs an interrupt process or uses register Write to transmit the ACK to the PF driver 115, thereby allowing the PF driver 115 to perform an ACK reception process (step S465).

What is claimed is:

1. A computer system capable for connecting a plurality of physical computers to an I/O device through ah I/O switch and sharing the I/O device;
   wherein each of the physical computers includes a plurality of logical partitions (LPARs) built on the physical computer and a virtual machine monitor for managing the plurality of LPARs;
   wherein the I/O device includes a Physical Function (PF), which can be allocated to one of the plurality of 10 physical computers, and a plurality of Virtual Functions (VFs), which can be allocated to the plurality of LPARs;
   wherein the virtual machine monitor included in the one of the physical computers to which the PF is allocated configures a master virtual machine monitor that includes a VF execution means for executing a VF event for the plurality of the VFs in the I/O device and a PF driver for controlling the PF;
   wherein the virtual machine monitor included in each of the other physical, computers configures a slave virtual machine monitor that includes a VF execution means for executing a VF event for the plurality of the VFs in the I/O device, and that Controls a plurality of the LPARs but does not control the PF;
   wherein the master virtual machine monitor includes a PF execution means for executing a PF event for the PF in the I/O device, the PF event being detected by the master or slave virtual machine monitor, and
   wherein, when the slave virtual machine monitor detects a PF event that is managed by the slave virtual machine monitor and generated for the PF from an LPAR to which a certain VF is allocated, the slave virtual machine monitor notifies the master virtual machine monitor of the PF event, allows the master virtual machine monitor to receive a notification of the PF event, and causes the PF execution means to execute the PF event.

2. The computer system according to claim 1, wherein the I/O device is a PCI-STG-compliant SR-IOV (Single Root I/O Virtualization) device.

3. The computer system according to claim 1, wherein the master virtual machine monitor transmits an acknowledgment to the slave virtual machine monitor after receiving the notification of the PF event, and allows the slave virtual machine monitor to perform an acknowledgment reception process on the PF event.

4. A computer system capable for connecting a plurality of physical computers to an I/O device through ah I/O switch and sharing the I/O device;
   wherein each of the physical computers includes a plurality of logical partitions (LPARs) built on the physical computer and a virtual machine monitor for managing the plurality of LPARs;
   wherein the I/O device includes a Physical Function (PF), which can be allocated to one of the plurality of 10 physical computers, and a plurality of Virtual Functions (VFs), which can be allocated to the plurality of LPARs;
   wherein the virtual machine monitor included in the one of the physical computers to which the PF is allocated configures a master virtual machine monitor that includes a VF execution means for executing a VF event for the plurality of the VFs in the I/O device and a PF driver for controlling the PF;
   wherein the virtual machine monitor included in each of the other physical, computers configures a slave virtual machine monitor that includes a VF execution means for executing a VF event for the plurality of the VFs in the I/O device, and that Controls a plurality of the LPARs but does not control the PF;

wherein the master virtual machine monitor includes a PF execution means for executing a PF event for the PF in the I/O device, the PF event being detected by the master or slave virtual machine monitor, wherein each of the plurality of LPARs of each of the physical computers includes a VF driver for controlling the VF allocated to the LPAR of each of the physical computers; and wherein, when the master virtual machine monitor detects a VF event that is generated for a certain VF from the PF allocated to the master virtual machine monitor, the master virtual machine monitor provides a notification of the slave virtual machine monitor, which manages the LPAR to which the certain VF is allocated, of the VF event, allows the slave virtual machine monitor to receive the notification of the VF event and transmit the VF event to the LPAR to which the certain VF is allocated, and causes the LPAR to execute the VF event by controlling the certain VF through the use of the VF driver possessed by the LPAR.

5. The computer system according to claim 4, wherein the slave virtual machine monitor, which manages the LPAR to which the certain VF is allocated, transmits an acknowledgment to the master virtual machine monitor after receiving the notification of the VF event, and allows the master virtual machine monitor to perform an acknowledgment reception process on the VF event.

6. The computer system according to claim 2, wherein a PF in each of a plurality of SR-IOV devices is allocated to an optional virtual machine monitor, and wherein the master virtual machine monitor is set up for each SR-IOV device.

7. The computer system according to claim 4, wherein the I/O device is a PCI-STG-compliant SR-IOV device.

8. The computer system according to claim 7, wherein a PF in each of a plurality of SR-IOV devices is allocated to an optional virtual machine monitor, and wherein the master virtual machine monitor is set up for each SR-IOV device.

* * * * *